(12) United States Patent
Barkan et al.

(10) Patent No.: US 11,941,479 B1
(45) Date of Patent: Mar. 26, 2024

(54) BI-OPTIC INDICIA READER HAVING TWO IMAGING ASSEMBLIES WITH RESPECTIVE FIELD OF VIEWS

(71) Applicant: ZEBRA TECHNOLOGIES CORPORATION, Lincolnshire, IL (US)

(72) Inventors: Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/072,465

(22) Filed: Nov. 30, 2022

(51) Int. Cl.
*G06K 7/10* (2006.01)
*G06K 7/14* (2006.01)

(52) U.S. Cl.
CPC ....... *G06K 7/1096* (2013.01); *G06K 7/10831* (2013.01); *G06K 7/10861* (2013.01); *G06K 7/1413* (2013.01)

(58) Field of Classification Search
None
See application file for complete search history.

(56) References Cited

U.S. PATENT DOCUMENTS

2023/0169285 A1* 6/2023 Handshaw ......... G06K 7/10722
235/462.43

* cited by examiner

*Primary Examiner* — Suezu Ellis (57) ABSTRACT

At least some embodiments of the present disclosure are directed to bi-optic indicia readers. In at least some embodiments the present invention is a bi-optic indicia reader that includes two FOVs which are configured to allow the reader to capture and successfully decode a 13-mil indicia presented to a respective FOV in a plane that is angled at least 80 degree to a plane that is defined by the window of the reader through which the FOV is passing.

9 Claims, 6 Drawing Sheets

BI-OPTIC INDICIA READER HAVING TWO IMAGING ASSEMBLIES WITH RESPECTIVE FIELD OF VIEWS

BACKGROUND

Multiplanar, or otherwise known as bi-optic, indicia readers are commonly used in retail environments for helping process checkout transactions. While these readers have traditionally been used for reading indicia on items, modern advancements in imaging technology and image processing have created novel use cases which go beyond simple capturing and decoding of indicia. Thus, there continues to exist a need for evolved bi-optic indicia reader designs that help facilitate new and emerging use cases.

SUMMARY

Accordingly, at least some embodiments of the present invention are directed to improved designs for bi-optic indicia readers.

In an embodiment, the present invention is an indicia reader that includes: a housing that has a lower housing portion with a first surface facing a product scanning region, the first surface of the lower housing portion including a generally horizontal window positioned in a transverse plane and an upper housing portion extending above the lower housing portion, the upper housing portion having a second surface facing the product scanning region, the second surface including a generally upright window positioned in a generally upright plane; a first imaging assembly having a first imaging sensor, the first imaging assembly configured to capture first image-data over a first field of view (FOV) extending through the generally upright window and directed at the product scanning region, the first FOV (FFOV) having a FFOV central axis, a FFOV upper boundary, a FFOV lower boundary, a first FFOV lateral boundary, and a second FFOV lateral boundary, the FFOV lower boundary being closer to the first surface of the lower housing than the FFOV upper boundary when extending over the first surface; a second imaging assembly having a second imaging sensor, the second imaging assembly configured to capture second image-data over a second FOV extending through the generally horizontal window and directed at the product scanning region, the second FOV (SFOV) having an SFOV central axis, an SFOV proximal boundary, an SFOV distal boundary, a first SFOV lateral boundary, and a second SFOV lateral boundary, SFOV proximal boundary being closer to the second surface of the upper housing than the SFOV distal boundary when extending in front of the second surface; and a decoder assembly configured to analyze at least one of the first image-data or the second image-data to decode a payload of an indicia appearing therein. In such embodiment, no other imaging FOV passes through either of the generally horizontal window and the generally upright window, and at least one of: the first imaging assembly is configured such that a first imaging sensor resolution and a spread angle of the FFOV enable the decoder assembly to decode a 13-mil indicia captured in the first image-data, the 13-mil indicia captured in the first image-data being presented to the FFOV in a first plane that is angled at least 80 degree to the generally upright plane, the 13-mil indicia captured in the first image-data being oriented such that at least some elements of the 13-mil indicia captured in the first image-data are closer to the generally upright plane than at least some other elements of the 13-mil indicia captured in the first image-data; or the second imaging assembly is configured such that a second imaging sensor resolution and a spread angle of the SFOV enable the decoder assembly to decode a 13-mil indicia captured in the second image-data, the 13-mil indicia captured in the second image-data being presented to the SFOV in a second plane that is angled at least 80 degree to the transverse plane, the 13-mil indicia captured in the second image-data being oriented such that at least some elements of the 13-mil indicia captured in the second image-data are closer to the transverse plane than at least some other elements of the 13-mil indicia captured in the second image-data.

In another embodiment, the present invention is an indicia reader that includes: a housing having a lower housing portion with a first surface facing a product scanning region, the first surface of the lower housing portion including a generally horizontal window positioned in a transverse plane and an upper housing portion extending above the lower housing portion, the upper housing portion having a second surface facing the product scanning region, the second surface including a generally upright window positioned in a generally upright plane; an imaging assembly having an imaging sensor, the imaging assembly having a primary field of view (FOV) that is split into a first FOV (FFOV) and a second FOV (SFOV), the imaging assembly being configured to (i) capture first image-data over the FFOV extending through the generally upright window and directed at the product scanning region, the FFOV having a FFOV central axis, a FFOV upper boundary, a FFOV lower boundary, a first FFOV lateral boundary, and a second FFOV lateral boundary, the FFOV lower boundary being closer to the first surface of the lower housing than the FFOV upper boundary when extending over the first surface, and (ii) capture second image-data over the SFOV extending through the generally horizontal window and directed at the product scanning region, the SFOV having an SFOV central axis, an SFOV proximal boundary, an SFOV distal boundary, a first SFOV lateral boundary, and a second SFOV lateral boundary, SFOV proximal boundary being closer to the second surface of the upper housing than the SFOV distal boundary when extending in front of the second surface; and a decoder assembly configured to analyze at least one of the first image-data or the second image-data to decode a payload of an indicia appearing therein. In such embodiment, no other imaging FOV passes through either of the generally horizontal window and the generally upright window, and at least one of: the imaging assembly is configured such that an imaging sensor resolution and a spread angle of the FFOV enable the decoder assembly to decode a 13-mil indicia captured in the first image-data, the 13-mil indicia captured in the first image-data being presented to the FFOV in a first plane that is angled at least 80 degree to the generally upright plane, the 13-mil indicia captured in the first image-data being oriented such that at least some elements of the 13-mil indicia captured in the first image-data are closer to the generally upright plane than at least some other elements of the 13-mil indicia captured in the first image-data; or the imaging assembly is configured such that the imaging sensor resolution and a spread angle of the SFOV enable the decoder assembly to decode a 13-mil indicia captured in the second image-data, the 13-mil indicia captured in the second image-data being presented to the SFOV in a second plane that is angled at least 80 degree to the transverse plane, the 13-mil indicia captured in the second image-data being oriented such that at least some elements of the 13-mil indicia captured in the second image-data are closer to the transverse plane than at least some other elements of the 13-mil indicia captured in the second image-data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

Figure 1:
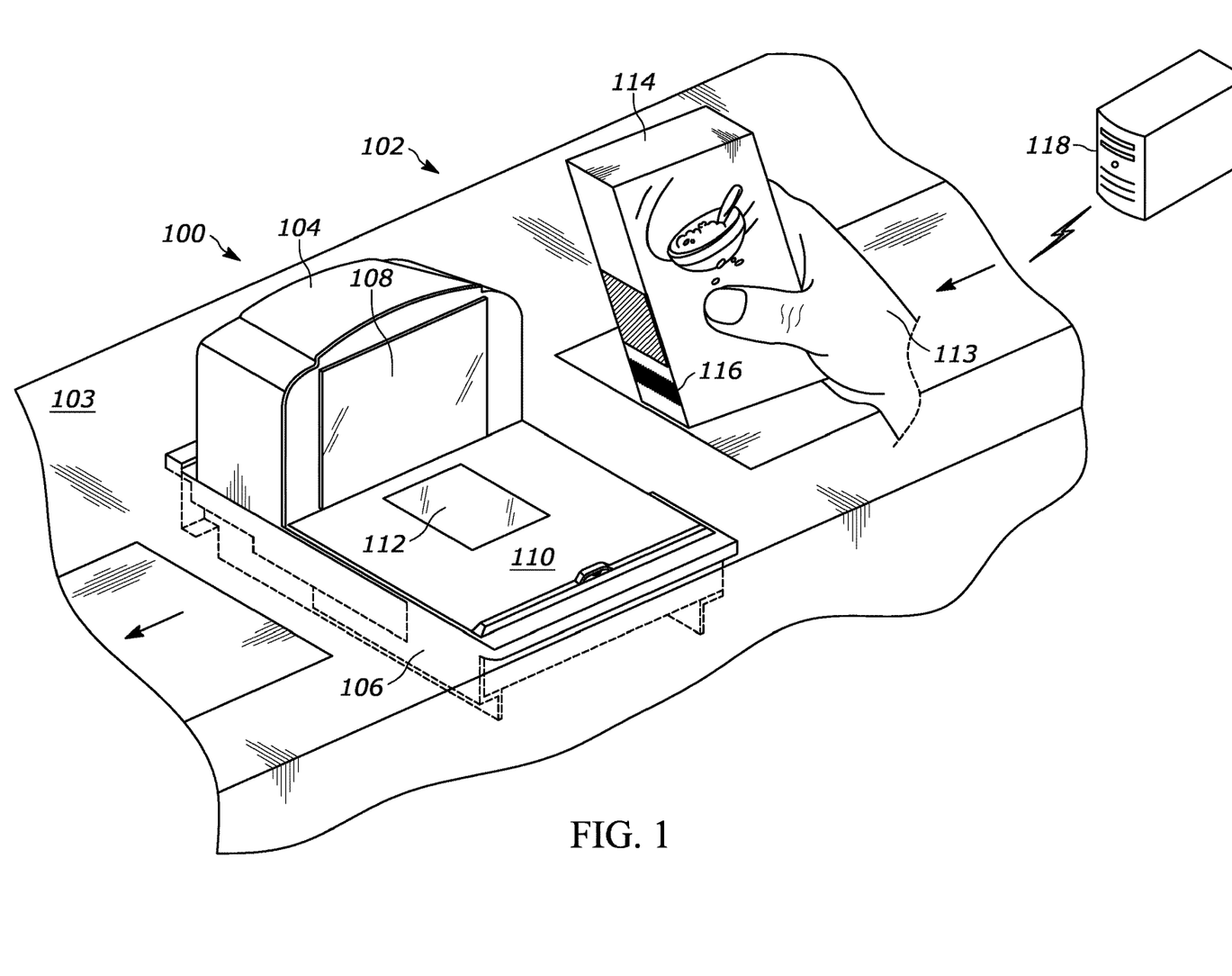
FIG. 1 is a perspective view of an example indicia reader in accordance with various embodiments of the present invention.

FIG. 1 illustrates a perspective view of an example bi-optic indicia reader 100 operable to utilize various imaging assembly configurations in accordance with embodiments of the present disclosure. As used herein, the term indicia should be understood to refer to any kind of visual marker that can be associated with an item. For example, indicia can be a 1D, 2D, or 3D barcode, a graphic, a logo, etc. Additionally, indicia may comprise encoded payload data as, for example, is the case with a 1D or 2D barcode where the barcode encodes a payload comprised of, for example, alphanumeric or special characters that may be formed into a string. In the illustrated example, the bi-optic indicia reader 100 is shown as part of a point-of-sale (POS) system arrangement 102 having the bi-optic indicia reader 100 positioned within a workstation counter 103. Generally, the indicia reader 100 includes an upper housing 104 (also referred to as an upper portion, upper housing portion, or tower portion) and a lower housing 106 (also referred to as a lower portion, lower housing portion, or platter portion). The upper housing 104 can be characterized by an optically transmissive window 108 positioned therein along a generally vertical plane and a horizontally extending field of view which passes through the window 108. The lower housing 106 can be characterized by a weigh platter 110 that includes an optically transmissive window 112 positioned therein along a generally horizontal (also referred to as a transverse) plane and a vertically extending field of view which passes through the window 112. The weigh platter 110 is a part of a weigh platter assembly that generally includes the weigh platter 110 and a scale (or load cell) configured to measure the weight of an object placed the top surface of the weight platter 110. By that virtue, the top surface of the weight platter 110 may be considered to be the top surface of the lower housing 106 that faces a product scanning region there above.

In operation, a user 113 generally passes an item 114 across a product scanning region of the indicia reader 100 in a swiping motion in some general direction, which in the illustrated example is right-to-left. A product scanning region can be generally viewed as a region that extends above the platter 110 and/or in front of the window 108 where barcode reader 100 is operable to capture image data of sufficient quality to perform imaging-based operations like decoding a barcode that appears in the obtained image data. It should be appreciated that while items may be swiped past the indicia reader 100 in either direction, items may also be presented into the product scanning region by means other than swiping past the window(s). When the item 114 comes into the any of the fields of view of the reader, the indicia 116 on the item 114 is captured and decoded by the indicia reader 100, and corresponding data is transmitted to a communicatively coupled host 118 (commonly comprised of a point of sale (POS) terminal).

Indicia reader 100 can utilize a variety of imaging assemblies and optical components to achieve the desired field of view(s) FOV(s) over which image data can be captured and transmitted to a processing host (such as a decoder (aka decoder assembly), processor, or ASIC that may be internal to the indicia reader 100) for decoding of indicia and further utilization of the decoded payload data. For example, an imaging assembly may include an image sensor (also referred to as an imager or imaging sensor) that can be, for example, a two-dimensional CCD or a CMOS sensor that can be either a monochrome sensor or a color sensor having, for instance 1.2 megapixels arranged in a 1200×960 pixel configuration. It should be appreciated that sensors having other pixel-counts (both below and above) are within the scope of this disclosure. These two-dimensional sensors generally include mutually orthogonal rows and columns of photosensitive pixel elements arranged to form a substantially flat square or rectangular surface. Such imagers are operative to detect light captured by an imaging lens assembly along a respective optical path or axis that normally traverses through either of the generally horizontal or generally upright window(s). In instances where multiple imaging assemblies are used, each respective imager and imaging lens assembly pair is designed to operate together for capturing light scattered, reflected, or emitted from indicia as pixel data over a respective FOV. In other instances, a single imaging assembly may be used to generate a single primary FOV which may be split, divided, and/or folded to generate multiple FOVs by way of splitter and/or fold mirrors. In such cases, data collected from various portions of the imaging sensor may be evaluated as if it was obtained by an individual imaging assembly/imaging sensor.

Turning to FIGS. 2-4B, shown therein is schematic view of an optical arrangement of a bi-optic reader in accordance with an embodiment of the present invention. In this embodiment, the reader 100 employs a first imaging assembly 200 and a second imaging assembly 300. Each respective imaging assembly includes a respective optics assembly 202, 302, and a respective image sensor 204, 304 positioned on a respective printed circuit board 206, 306. Each lens assembly includes one or more lenses configured to direct light over a certain field of view (FOV) onto the respective image sensor. By these means, each image sensor is operative to capture image data representative of an environment that appears within each respective FOV.

Figure 2:
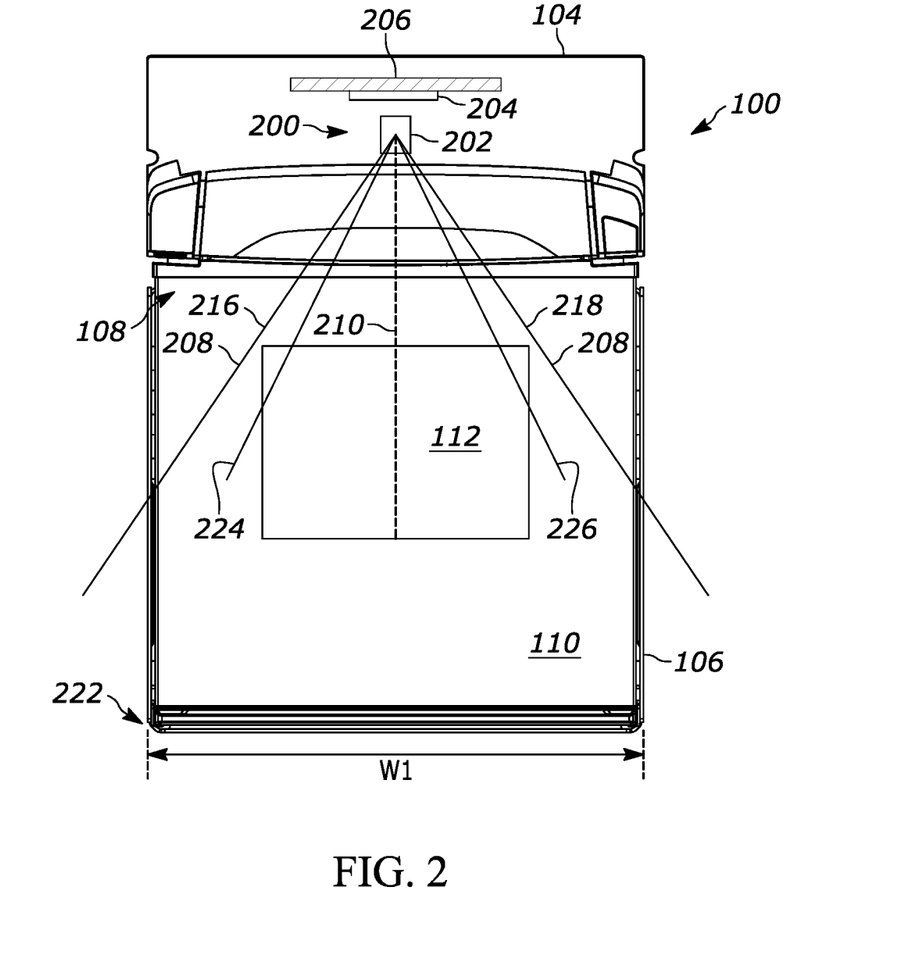
FIG. 2 is an example top-down schematic view of an example indicia reader in accordance with embodiments of the present disclosure.
Figure 4A:
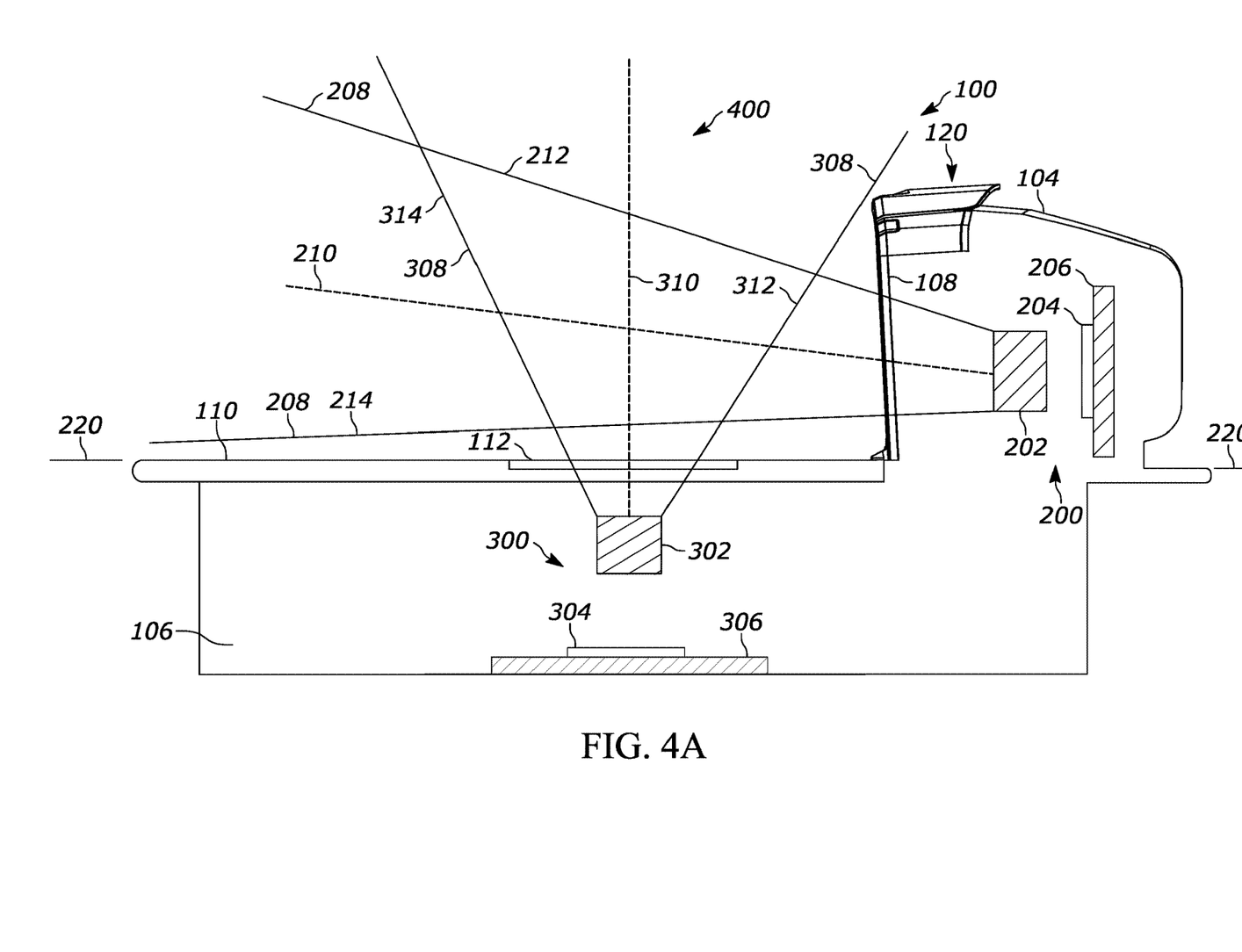
FIG. 4A is an example side schematic view of the indicia reader of FIG. 1.
Figure 4B:
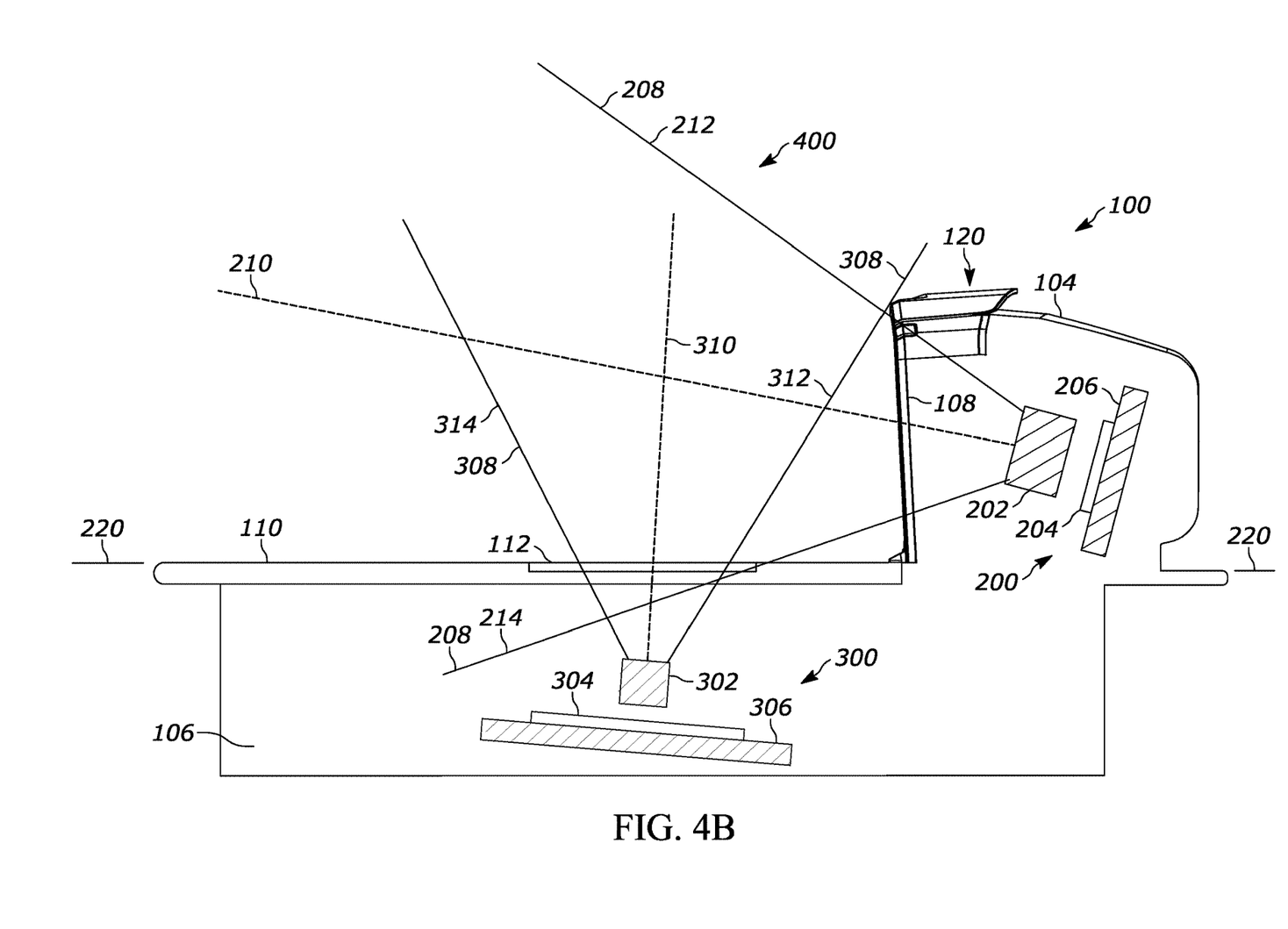
FIG. 4B is an example side schematic view of the indicia reader of FIG. 1.

Referring to FIGS. 2, 4A, and 4B, the first imaging assembly 200 is configured to capture image-data over a first FOV (FFOV) 208. As illustrated, FFOV 208 extends through the generally upright window 108 and is directed at the product scanning region 400 of the reader 100. The FFOV 208 includes a FFOV central axis 210, a FFOV upper boundary 212, a FFOV lower boundary 214, a first FFOV lateral boundary 216, and a second FFOV lateral boundary 218. In the provided embodiment, the FFOV lower boundary 214 closer to the top surface of the lower housing 106 than the FFOV upper boundary 212. In some embodiments, like the one shown in FIG. 4A, the image assembly 200 is configured such that the vertical spread angle of the FFOV 208 and/or its central axis 210 are configured such that the lower boundary 214 does no intersect the transverse plane 220 prior to reading an edge of the platter that is distal relative to the upper portion 104. Additionally, the imaging assembly 200 may be configured such that the lower boundary 214 has a slope no greater than 10 degrees relative to the transverse plane 220. Utilizing this configuration and positioning the imaging assembly 200 such that the lower boundary 214 of the FFOV 208 is relatively low to the platter 110 can help reduce dead zones where indicia may not be read by virtue of being outside the area visible to the image sensor 204.

In some other embodiments, like the one shown in FIG. 4B, the image assembly 200 is configured such that the vertical spread angle of the FFOV 208 and/or its central axis 210 are configured such that the lower boundary 214 does intersect the transverse plane 220 at or before the window 112 relative to its position to the upper portion 104. This configuration may help avoid dead spots above the platter while also positioning the imaging assembly 200 higher relative to the transverse plane 220.

Additionally, in some embodiments the image assembly 200 may be configured such that the vertical spread angle of the FFOV 208 and/or its central axis 210 are configured to have the upper boundary 212 extend sufficiently high to allow for the imaging assembly 200 to capture image data relating to the user of the reader 100. For instance, it may be beneficial to capture facial characteristics for purposes of consumer loyalty programs, shrink detection, system wakeup purposes, and so on. In this instance, the upper boundary 212 of the FFOV 208 should be angled high enough to capture a user standing in front of the reader 100 such that the user would be expected to perform certain operations thereon. In at least some embodiments, the upper boundary 212 forms a 45 to 70 degree angle relative to the transverse plane 220.

Turning back to FIG. 2, in certain embodiments the image assembly 200 may be configured such that the lateral spread angle of the FFOV 208 is configured such that the FFOV 208 is sufficiently wide to have an entirety of the generally horizontal window 212 appears below the FFOV 208 when viewed directly from above as in FIG. 2. This may be achieved by having a spread angle of 55 degrees or greater. In some other embodiments, the image assembly 200 may be configured such that the lateral spread angle of the FFOV 208 is configured such that the FFOV 208 is sufficiently wide to have a major portion (but not an entirety) of the generally horizontal window 212 appears below the FFOV 208 when viewed directly from above as in FIG. 2. This may be achieved by having a spread angle of between 45 degrees and 55 degrees, as illustrated by lateral boundaries 224 and 226.

In some embodiments, the image assembly 200 may be configured to have the spread angle of the FFOV sufficiently wide to have a width of the FFOV 208 between the first FFOV lateral boundary 216 and the second FFOV lateral boundary 218 exceed a width W1 (which in some embodiments is between 11 and 12 inches) of the lower housing portion 106 before the FFOV 208 reaches a distal edge 222 of the lower portion 106, when viewed directly from above as in FIG. 2.

To achieve such wide angles while maintaining sufficient resolution of items presented in the product scanning region throughout a range of operable distances, it is preferable to position imaging assembly 200 at least 2 inches behind the generally upright window 108. In some examples this means that the light-receiving entry surface of the lens assembly 202 is positioned at least 2 inches behind the generally upright window 108. In other examples, this means that the light-receiving surface of the imaging sensor 204 is positioned at least 2 inches behind the generally upright window 108. Positioning the imaging assembly this far back can allow for the FOV to cover a relatively large cross-sectional area throughout its working range without diverging too quickly. Additionally, this can allow for the FFOV 208 to be large enough to cover at least 30% of the generally upright window 108 when it passes through that window.

Figure 3:
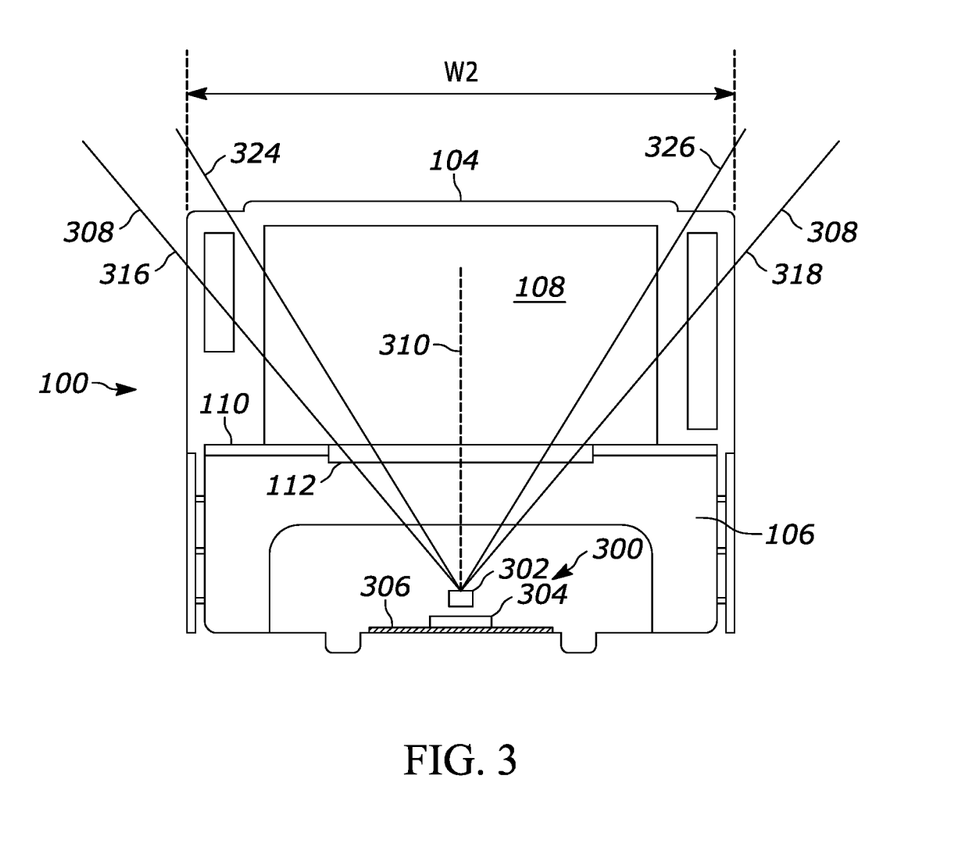
FIG. 3 is an example front-to-back schematic view of the indicia reader of FIG. 1.

Turning now to FIGS. 3, 4A, and 4B, the second imaging assembly 300 is configured to capture image-data over a second FOV (SFOV) 308. As illustrated, SFOV 308 extends through the generally horizontal window 112 and is directed at the product scanning region 400 of the reader 100. The SFOV 308 includes an SFOV central axis 310, an SFOV proximal boundary 312, an SFOV distal boundary 314, a first SFOV lateral boundary 316, and a second SFOV lateral boundary 318. In the provided embodiment, the SFOV proximal boundary 312 is closer to a surface of the upper housing 104 facing the product scanning region 400 (e.g., a surface defined by the windows 108 that is facing the product scanning region 400) than the SFOV distal boundary 314, when the SFOV 308 extends in front of the that surface. In some embodiments, like the one shown in FIG. 4A, the image assembly 300 is configured such that the longitudinal spread angle of the SFOV 308 and/or its central axis 310 are configured such that the proximal boundary 308 passes within 2 inches of the top 120 of the upper housing 104 and such that the SFOV 308 does not capture any portion of the generally upright window 108. In some embodiments, like those shown in FIG. 4B, the image assembly 300 is configured such that the longitudinal spread angle of the SFOV 308 and/or its central axis 310 are configured such that the proximal boundary 308 abuts or includes the top 120 of the upper housing 104 and such that the SFOV 308 does not capture any portion of the generally upright window 108. While in some embodiments the central axis 310 of the SFOV 308 is normal to the transverse plane 220, in other embodiments the central axis 310 is inclines at up to 20 degrees relative to the transverse plane 220.

Referring to FIG. 3, in certain embodiments the image assembly 300 may be configured where the lateral spread angle of the SFOV 308 between the two lateral boundaries 316 and 318 is sufficiently wide to have a width of the SFOV 308 between the first SFOV lateral boundary 316 and the second SFOV lateral boundary 318 exceed a width W2 (which in some embodiments is between 11 and 12 inches) of the upper housing portion 104 before the SFOV 308 reaches the top 120 of the upper housing 104, when viewed directly from the front as in FIG. 3. This may be achieved by having a spread angle of 55 degrees or greater. In some other embodiments, the imaging assembly 300 many have a lateral spread angle of between 45 degrees and 55 degrees, as illustrated by lateral boundaries 324 and 326.

To achieve such wide angles while maintaining sufficient resolution of items presented in the product scanning region throughout a range of operable distances, it is preferable to position imaging assembly 300 at least 3 inches below the generally horizontal window 112. In some examples this means that the light-receiving entry surface of the lens assembly 302 is positioned at least 3 inches behind the generally horizontal window 112. In other examples, this means that the light-receiving surface of the imaging sensor 304 is positioned at least 3 inches behind the generally horizontal window 112. Positioning the imaging assembly this low can allow for the FOV to cover a relatively large cross-sectional area throughout its working range without diverging too quickly. Additionally, this can allow for the SFOV 308 to be large enough to cover at least 80% of the generally horizontal window 112 when it passes through that window.

As shown in FIGS. 2-4B, the embodiment described therein avoids the use of any fold mirrors or splitter mirrors to directs its FOVs 208 and 308 into the product scanning region. Instead, both imaging assemblies have a direct view of the product scanning region 400. This can decrease the need for precise alignment of mirrors, reduce cost associated with these parts, and increase robustness of the overall device.

A particular advantage of the embodiments described herein is that the either of the imaging assemblies 200 or 300 can be configured such that a respective imaging sensor resolution and a spread angle of the respective FOV enable the decoder assembly to decode a 13-mil indicia captured in the image-data, where that 13-mil indicia is presented to the respective FOV in a plane that is angled at least 80 degree to the generally upright plane defined by the generally upright window (if the first imaging assembly 200 and the data captured thereby is under consideration) or the transverse plane defined by the generally horizontal window (if the second imaging assembly 300 and the data captured thereby is under consideration). This could be particularly advantageous when the 13-mil indicia is oriented such that at least some elements of the 13-mil indicia captured in the respective image-data are closer to the respective window (though which the image data is captured (and the plane that is defines than at least some other elements of the 13-mil indicia captured in that image-data. For example, referring to FIG. 1, in case if scanning a 1D barcode 116 by way of capturing image data through the generally upright window 108, certain bars of the barcode 116 will be closer to the generally upright plane defined by the generally upright window 108 than certain other bars. While this example refers to a 1D barcode, it should be appreciated that the same functionality can extend to other 1D and/or 2D indicia.

Figure 5:
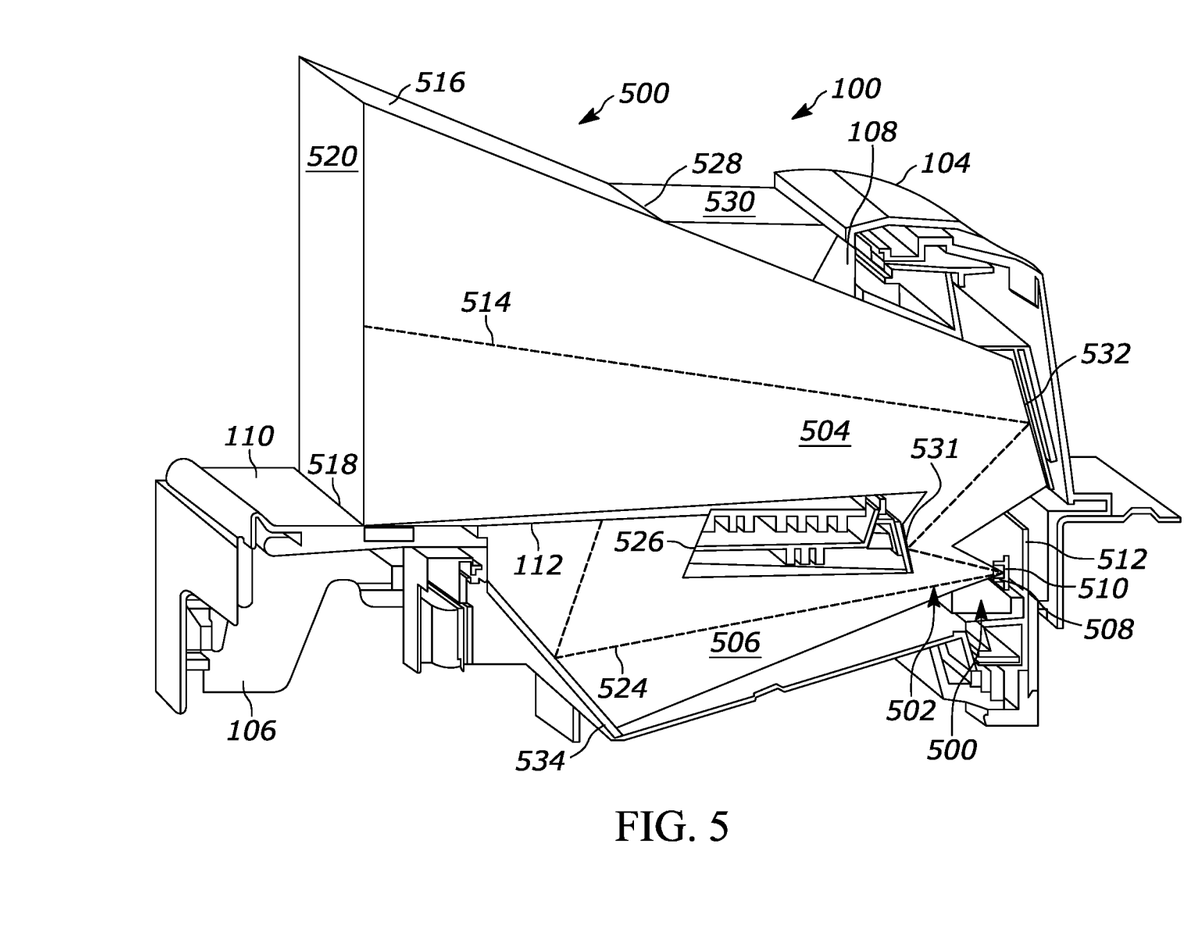
FIG. 5 is a perspective cross-section view of another example indicia reader in accordance with embodiments of the present disclosure.

An alternate embodiment is illustrated in FIG. 5 where the indicia reader 100 shown therein includes only a single imaging assembly 500 that has a primary FOV 502 that is split into a first FOV (FFOV) 504 and a second FOV (SFOV) 506. As with the prior embodiment, the imaging assembly 500 includes a lens assembly 508 and an imaging sensor 510 positioned on a PCB 512. The embodiment of FIG. 5 allows the imaging assembly 500 to be configured to capture first image-data over the FFOV 504 extending through the generally upright window 108 and directed at the product scanning region 500 and further to capture second image-data over the SFOV 506 extending through the generally horizontal window 112 and directed at the product scanning region 500. Regarding the FFOV 504, includes a FFOV central axis 514, a FFOV upper boundary 516, a FFOV lower boundary 518, a first FFOV lateral boundary 520, and a second FFOV lateral boundary (not shown due to the illustration being a cross-section). As illustrated, the FFOV lower boundary 518 is shown as being closer to the top surface of the lower housing 106 than the FFOV upper boundary 516 when extending over that surface. Regarding the SFOV 506, it includes an SFOV central axis 524, an SFOV proximal boundary 526, an SFOV distal boundary 528, a first SFOV lateral boundary 530, and a second SFOV lateral boundary (not shown due to the illustration being a cross-section). As illustrated, the SFOV proximal boundary 526 is closer to forward facing surface (as defined by, for example, the window 108) of the upper housing 104 than the SFOV distal boundary 528 when extending in front of that surface.

The primary difference between the embodiment of FIGS. 2-4B and FIG. 5 is that the embodiment of FIG. 5 the FFOV 504 and the SFOV 506 are achieved with a mirror arrangement. Specifically, this mirror arrangement consists of a splitter mirror 531 configured to split the primary FOV 502 into the FFOV 504 and the SFOV 506, a first fold mirror 532 configured to redirect the FFOV through the generally upright window 108, and a second fold mirror 534 configured to redirect the SFOV 506 through the generally horizontal window 112. In this instance the advantages are realized by a reduced number of imaging assemblies, reducing cost and increasing reliability that come with the use of a single part rather than the use of multiple parts. However, it should be appreciated that that all features outlined above with respect to the embodiment of FIGS. 2-4B are equally applicable to the embodiment of FIG. 5. Accordingly, it should be understood that it is within the scope of present disclosure to configure the optical assembly and the FFOV 504 and SFOV 506 dimensions to achieve the same performance as described above.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An indicia reader comprising:
   a housing including:
      a lower housing portion with a first surface facing a product scanning region, the first surface of the lower housing portion including a horizontal window positioned in a transverse plane; and
      an upper housing portion extending above the lower housing portion, the upper housing portion having a second surface facing the product scanning region, the second surface including a upright window positioned in an upright plane;
   a first imaging assembly having a first imaging sensor, the first imaging assembly configured to capture first image-data over a first field of view (FOV) extending through the upright window and directed at the product scanning region, the first FOV (FFOV) having a FFOV central axis, a FFOV upper boundary, a FFOV lower boundary, a first FFOV lateral boundary, and a second FFOV lateral boundary, the FFOV lower boundary being closer to the first surface of the lower housing than the FFOV upper boundary when extending over the first surface;
   a second imaging assembly having a second imaging sensor, the second imaging assembly configured to capture second image-data over a second FOV extending through the horizontal window and directed at the product scanning region, the second FOV (SFOV) having an SFOV central axis, an SFOV proximal boundary, an SFOV distal boundary, a first SFOV lateral boundary, and a second SFOV lateral boundary, SFOV proximal boundary being closer to the second surface of the upper housing than the SFOV distal boundary when extending in front of the second surface; and
   a decoder assembly configured to analyze at least one of the first image-data or the second image-data to decode a payload of an indicia appearing therein,
   wherein no other imaging FOV passes through either of the horizontal window and the upright window, and
   wherein at least one of:
      the first imaging assembly is configured such that a first imaging sensor resolution and a spread angle of the FFOV enable the decoder assembly to decode a 13-mil indicia captured in the first image-data, the 13-mil indicia captured in the first image-data being presented to the FFOV in a first plane that is angled at least 80 degree to the upright plane, the 13-mil indicia captured in the first image-data being oriented such that at least some elements of the 13-mil indicia captured in the first image-data are closer to the upright plane than at least some other elements of the 13-mil indicia captured in the first image-data; or
      the second imaging assembly is configured such that a second imaging sensor resolution and a spread angle of the SFOV enable the decoder assembly to decode a 13-mil indicia captured in the second image-data, the 13-mil indicia captured in the second image-data being presented to the SFOV in a second plane that is angled at least 80 degree to the transverse plane, the 13-mil indicia captured in the second image-data being oriented such that at least some elements of the 13-mil indicia captured in the second image-data are closer to the transverse plane than at least some other elements of the 13-mil indicia captured in the second image-data.

2. The indicia reader of claim 1, wherein the spread angle of the FFOV is measured between the first FFOV lateral boundary and the second FFOV lateral boundary,
   wherein the spread angle of the SFOV is measured between the first SFOV lateral boundary and the second SFOV lateral boundary, and
   wherein at least one of the spread angle of the FFOV or the spread angle of the SFOV is at least 55 degrees.

3. The indicia reader of claim 1, wherein the first imaging sensor is a monochrome sensor and the second imaging sensor is a color sensor.

4. The indicia reader of claim 1, wherein at least one of the FFOV or the SFOV omits any fold mirrors in its respective path.

5. The indicia reader of claim 1, wherein the FFOV occupies at least 30% of the upright window when it passes through the upright window, and wherein the SFOV occupies at least 80% of the horizontal window when it passes through the horizontal window.

6. The indicia reader of claim 1, wherein the spread angle of the FFOV is measured between the first FFOV lateral boundary and the second FFOV lateral boundary, and
   wherein the spread angle of the FFOV is sufficiently wide such that, when viewed directly from above, an entirety of the horizontal window appears below the FFOV.

7. The indicia reader of claim 1, wherein the first imaging sensor is recessed at least 2 inches behind the upright window, and wherein the second imaging sensor is recessed at least 3 inches below the horizontal window.

8. The indicia reader of claim 1, wherein the spread angle of the FFOV is measured between the first FFOV lateral boundary and the second FFOV lateral boundary,
   wherein the spread angle of the SFOV is measured between the first SFOV lateral boundary and the second SFOV lateral boundary, and
   wherein at least one of:
      the spread angle of the FFOV is sufficiently wide such that, when viewed directly from above, a width of the FFOV between the first FFOV lateral boundary and the second FFOV lateral boundary exceeds a width of the lower housing portion before reaching a distal edge of the lower housing portion, or the spread angle of the SFOV is sufficiently wide such that, when viewed directly from the front, a width of the SFOV between the first SFOV lateral boundary and the second SFOV lateral boundary exceeds a width of the upper housing portion before reaching a top of the upper housing portion.

9. The indicia reader of claim 1, wherein at least one of (i) the 13-mil indicia captured in the first image-data is a one-dimensional (1D) barcode being oriented such that its bars are parallel to the upright plane, or (ii) the 13-mil indicia captured in the second image-data is a 1D barcode being oriented such that its bars are parallel to the transverse plane.

* * * * *